US006528190B1

(12) United States Patent
Campbell et al.

(10) Patent No.: US 6,528,190 B1
(45) Date of Patent: Mar. 4, 2003

(54) FIBER COATING COMPOUNDS FOR REINFORCED CERAMIC MATRIX COMPOSITES

(75) Inventors: Christian X. Campbell, Orlando, FL (US); Jay E. Lane, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 147 days.

(21) Appl. No.: 09/631,097

(22) Filed: Aug. 2, 2000

(51) Int. Cl.$^7$ ................................................. B32B 9/00
(52) U.S. Cl. .................... 428/701; 428/702; 428/293.4; 428/294.1; 428/332
(58) Field of Search ................................. 428/701, 702, 428/293.4, 294.1, 375, 378, 379, 332

(56) References Cited

U.S. PATENT DOCUMENTS

| | | | |
|---|---|---|---|
| 5,098,871 A | * | 3/1992 | Ray |
| 5,514,474 A | | 5/1996 | Morgan et al. |
| 5,759,632 A | | 6/1998 | Boakye et al. |
| 5,945,166 A | | 8/1999 | Singh et al. |
| 6,013,592 A | | 1/2000 | Merrill et al. |

FOREIGN PATENT DOCUMENTS

EP          09055281 A1          11/1999

OTHER PUBLICATIONS

Bayer, G., "Thermal expansiion of ABO4–Compounds with Zicron–and Scheelite Structures", Journal of the Less Common Metals, 1972, pp. 255–262, vol. 26, No month.

Morgan, P. E. D. et al., "Functional Interfaces for Oxide/Oxide Composites", Materials Science and Engineering, 1993, pp. 15–25, vol. A162, No month.

Colomban, P. et al., "Sol–Gel Mullite Matrix–SiC and – Mullite 2D Woven Fabric Composites With or Without Zirconia Containing Interphase: Eleaboration and Properties", Journal of the European Ceramic Society, 1996, pp. 201–314, vol. 16, No month.

Michel, D. et al., "Germanium Mullite: Structure and Vibrational Spectra of Gels, Glasses and Ceramics", Journal of the European Ceramic Society, 1996, pp. 161–168, vol. 16, No month.

Goettler, R. W. et al., "Isotropic Complex Oxides as Fiber Coatings for Oxide–Oxide CFCC", Ceramic Engineering and Science Proceedings., 1997, pp. 279–286, vol. 18(3), No month.

Marshall, D. B. et al., "Debonding in Multilayered Composites of Zirconia and LaPO4", Journal of the American Ceramic Society, 1997, pp. 1677–1683, vol. 80(7), No month.

Committee on Advanced Fibers for High–Temperature Ceramic Composites, "Ceramic Fibers and Coatings: Advanced Materials for the Twenty–First Century", National Research Council, 1998, pp. 54–74, Pub. NMAB–494, No month.

Karlin, S. et al., "Phase Diagram, Short–Range Structure and Amorphous Phases in the ZrO2–GeO2(–H2O) System", Journal of the American Ceramic Society, 1999, pp. 735–741, vol. 82(3) No month.

Karlin S. et al., Raman Study of the Chemical and Thermal Degradation of Raw Nicalon and Hi Nicalon SiC Fibres and of Sol–Gel Protected Fibres, ISBN: 1–85573–304–8, pp. 389–94 No date.

* cited by examiner

*Primary Examiner*—Deborah Jones
*Assistant Examiner*—Jennifer McNeil

(57) ABSTRACT

A composite (20) has a matrix (10), preferably of ceramic, interspersed with reinforcement structures (12), preferably ceramic fibers, coated with a material (14) selected from $ZrGeO_4$, $HfGeO_4$ and $CeGeO_4$, where the composite can be used as a component in high temperature turbines.

21 Claims, 1 Drawing Sheet

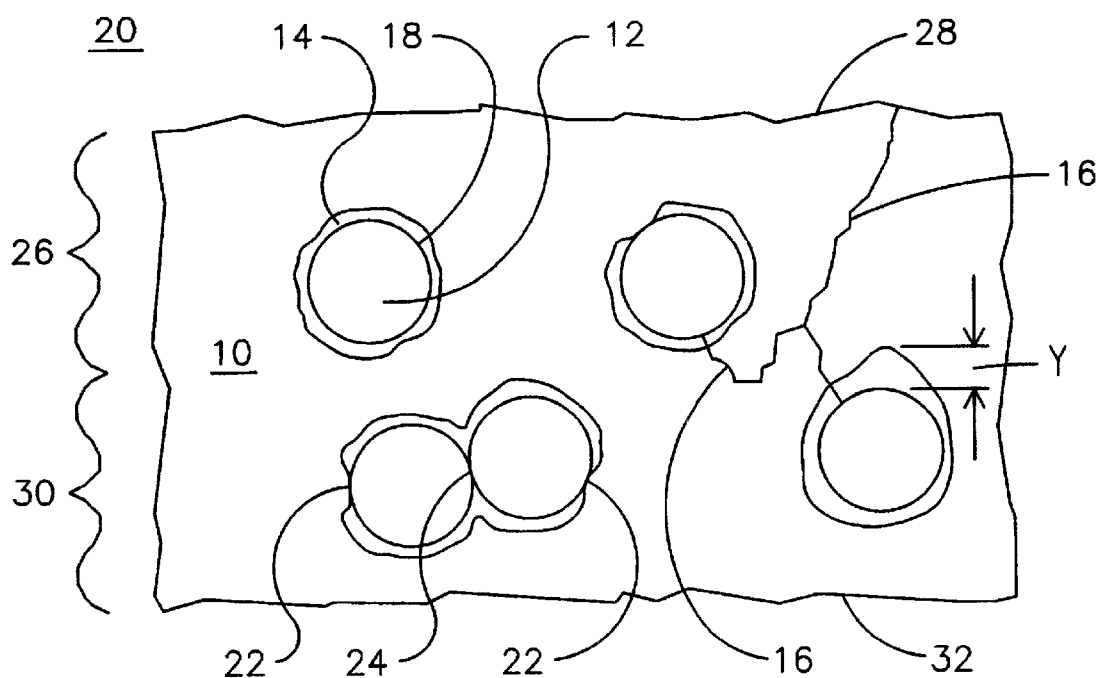

FIBER COATING COMPOUNDS FOR REINFORCED CERAMIC MATRIX COMPOSITES

BACKGROUND OF THE INVENTION

1. Field of the Invention

The present invention relates generally to high temperature capable ceramic matrix composites (CMCs), and more particularly to their application in gas turbines.

2. Background Information

Combustion turbines comprise a casing or cylinder for housing a compressor section, combustion section and turbine section. The compressor section comprises an inlet end and a discharge end. The combustion section or combustor comprises an inlet end and a combustor transition. The combustor transition is proximate the discharge end of the combustion section and comprises a wall which defines a flow channel which directs the working fluid into the turbine section's inlet end.

A supply of air is compressed in the compressor section and directed into the combustion section. Fuel enters the combustion section by means of a nozzle. The compressed air enters the combustion inlet and is mixed with the fuel. The air/fuel mixture is then combusted to produce high temperature and high pressure gas. This working gas is then ejected past the combustor transition and injected into the turbine section to run the turbine.

The turbine section comprises rows of vanes which direct the working gas to the airfoil portions of the turbine blades. The working gas flows through the turbine section causing the turbine blades to rotate, thereby turning the rotor, which is connected to a generator for producing electricity.

As those skilled in the art are aware, the maximum power output of a combustion turbine is achieved by heating the gas flowing through the combustion section to as high a temperature as is feasible. The hot gas, however, heats the various turbine components, such as the combustor, transition ducts, vanes and ring segments, that it passes when flowing through the turbine.

Accordingly, the ability to increase the combustion firing temperature is limited by the ability of the turbine components to withstand increased temperatures. Consequently, various cooling methods have been developed to cool turbine hot parts. These methods include open-loop air cooling techniques and closed-loop steam cooling systems. Both techniques, however, require significant design complexity, have considerable installation and operating costs and often carry attendant losses in turbine efficiency.

In addition, various insulation materials have been developed to strengthen the resistance of turbine critical components to increased temperature. Thermal Barrier Coatings (TBCs) are commonly used to protect critical components from premature breakdown due to increased temperatures to which the components are exposed. Generally, TBCs extend the life of critical components by reducing the rate of metal waste (through spalling) by oxidation.

In Advanced Turbine Systems (ATSs), however, the temperature demands of operation and the limits of ATS state-of-the-art materials, may lead to failure of the TBCs. This, in turn, can result in premature failure of the critical components and therefore, possible failure of the turbine, interruption in the power supply and expensive repair costs. It is, therefore, desirable to provide turbine components that can withstand high temperatures without the use of thermal barrier coatings and reduce the need for cooling.

Commercially available oxide fiber/oxide matrix ceramic matrix composites (CMCS) have many potential applications in gas turbines, but are limited in their exposure to temperatures near 1000–1100° C. for long periods of time, that is, greater than 10,000 hours for gas turbines used in power generation. In addition, CMCs cannot be effectively cooled under high temperature conditions (greater than 1400° C.) or high heat flux conditions due to their relatively low thermal conductivity and inability to fabricate intricate cooling passages. Furthermore, while commercially available CMCs already have good toughness, strain and damage tolerance, improvements in these areas are a continual goal for the development of CMCs.

Combustion of the fuel/air mixture occurs at temperatures much higher than the melting point of the metallic combustor liner. For this reason, the liners must be cooled by non-combusted, cooler air and are usually coated with thermal barrier coatings. The most common way of cooling metallic liners is by way of film cooling, which introduces cool air through the wall of the liner by way of small holes drilled at an acute angle to the surface. This air, in turn, forms a cooler boundary layer on the inside surface of the combustor liner, protecting it from the hot combustion gases. One of the problems with film cooling is that undesirable combustion byproducts (carbon monoxide and unburned hydrocarbons) occur when the cooler air mixes with the hot gases. In anticipation of dilution due to film cooling, the fuel/air mixture is consequently richer than desirable, resulting in excessive $NO_x$ emissions. A true hot wall combustor requires no film cooling (resulting in lower carbon monoxide and unburned hydrocarbons emissions), allows leaner combustion (resulting in lower $NO_x$ emissions), and provides increased flame stability (resulting in greater durability and reliability).

The transition duct is a large, complex structure which contains the hot combustion gases and directs them into the turbine inlet. The large surface area and the high internal temperature make these parts extremely difficult to cool effectively. Conventional transitions are made from nickel-based superalloys coated internally with thermal barrier coatings. The latest high efficiency utility engines necessitate that these parts be actively cooled, requiring internal wall cooling passages, and complex and costly construction. With much simpler construction, lower cost components would be possible using an insulated CMC concept. Passive cooling methods could be employed using redirected combustor inlet gases, resulting in net efficiency gains.

The first stage of turbine vanes direct the combustion exhaust gases to the airfoil portions of the first row of rotating turbine blades. These vanes are subjected to high velocity, high temperature gases under high pressure conditions. In addition, these are complex parts with high surface areas and, therefore, are difficult to cool to acceptable temperatures. Conventional state-of-the-art first row turbine vanes are fabricated from single-crystal superalloy castings with intricate cooling passages and with external thermal barrier coatings applied. Not only are these components expensive to manufacture, but with ever-increasing gas path temperatures, their ability to be effectively cooled is limited. Higher temperature materials would obviate the need for such complexity, thus minimizing cost, and also minimizing the need for cooling air, thereby improving engine efficiency and reducing operating costs.

The rotating turbine or rotor of an axial flow gas turbine consists of a plurality of blades attached to a rotor disk. In operation, the shaft and blades rotate inside a shroud. Preferably, the inner surface of the inner wall of the shroud is coated with an abradable material. The initial placement of the rotor blades are such that the blade tips are as close as possible to the coating. Improvements in this essential component are also desirable.

U.S. patent application Ser. No. 09/049,369, filed on Mar. 27, 1998 (Attorney Docket No. T2 97-26; Morrison et al.) attempted to solve many of the above problems by providing a new and improved ceramic composition that could be bonded to standard ceramic matrix composites, to provide a hybrid-CMC. The ceramic composition used there contained a plurality of hollow, oxide-based spheres of various dimensions, a phosphate binder, and a solid oxide filler, where the binder filled gaps between the hollow spheres and the filler. Each sphere was situated such that it was in contact with at least one other sphere. The ceramic composition acted as a high temperature insulator, which was also abradable, to be applied over the higher strength, lower temperature resistant CMC. The two could be mated with a thin layer of aluminum phosphate-based or alternative high temperature adhesive. The CMC used could be made of oxide matrix composites (such as mullite, aluminosilicate or alumina), silicon carbide matrix composites, or silicon nitride matrix composites. The CMC used could be in the form of turbine blades, combustors, transition ducts, vanes, ring segments, and the like, with the ceramic composition bonded to their surfaces. U.S. Pat. No. 6,013,592 (Merrill et al.) is a similar patent in this area.

Fiber, whisker and particulate reinforced thermodynamically-stable high temperature ceramic matrix composites are also known in the art, such as those taught in U.S. Pat. No. 5,514,474 (Morgan et al.). There, a weak interface coating between the reinforcement fibers and the ceramic matrix was thought desirable, to allow debonding and sliding of the reinforcement if a crack were to impinge upon it from the matrix. The interface coating in the fibers was a monazite, $MPO_4$, where M was a larger trivalent rare earth of the lanthanide series, such as La, Ce, Pr, etc.); alternately, the interface coating was a xenotime, $MPO_4$, where M was a smaller trivalent rare earth of the lanthanide series, such as Sc, Y, Dy, Ho, etc. In the examples, the reinforcing fibers, such as thin sapphire fibers, were coated with a $LaPO_4$ coating, using a slurry dipping process. $Al_2O_3$, $MgAl_2O_4$, $ZrO_2$, SiC and mullite fibers were also disclosed.

A similar fiber reinforced composite was described in U.S. Pat. No. 5,759,632 (Boakye et al.). There, however, the interface coating—a monazite—was applied by a sol-gel dipping technique. Another useful fiber coating interlayer for CMCs is $CaWO_4$, as demonstrated in "Isotropic Complex Oxides as Fiber Coatings for Oxide/Oxide CFCCS" (R. W. Goettler et al., Ceramic Engineering and Science Proceedings, vol. 18, no. 3, 1997, pp. 279–286.)

Karlin et al., in "Phase Diagram, Short-Range Structure, and Amorphous Phases in the $ZrO_2$–$GeO_2$(—$H_2O$) System" (*Journal of the American Ceramics Society*, vol. 82, no. 3, 1999, pp. 735–741), discussed the processing of $(1-x)ZrO_2$-$xGeO_2$. According to the article, preparation of glasses and ceramics via the sol-gel route allowed preparation of: high-purity materials, glasses from reluctant glass-forming materials, homogeneously dispersed nanocomposites, and thin coatings, particularly for fiber reinforced composites. There, the use of long ceramic fibers embedded in a refractory matrix, resulting in a tough pseudo-plastic material having important uses as advanced engine composites, was discussed. $ZrO_2$ was identified as an appropriate interface coating for thermally stable CMCs. Phase relationships were studied, and thermogravimetric and shrinkage analyses were performed.

New interface coating systems are needed at the fiber/matrix interface in CMCs, in order to allow fabrication of increasingly damage tolerant and more thermally stable CMCs for components used in gas turbine operations. CMCs are needed which require reduced cooling air flow and which are made with relatively inexpensive and commercially available materials. Such CMCs should also be useful in combination with a ceramic insulating layer, to provide longer-life hybrid-CMC components.

SUMMARY OF THE INVENTION

Thus, it is a main object of the invention to provide a ceramic matrix composite (CMC) having high temperature and damage tolerance capability, for use in a gas turbine environment, comprising a suitably coated particulate or fibrous material in a ceramic matrix.

It is another main object of this invention to provide a ceramic matrix composite and a hybrid ceramic matrix composite which require reduced cooling air flows and which are made with relatively inexpensive and commercially available materials.

These and other objects of this invention are accomplished by providing a composite having high temperature and damage tolerance capability, comprising a matrix material having interspersed therein solid reinforcement structures coated with an interface coating material consisting essentially of scheelite germanates of the formula $MGeO_4$, where M consists of elements selected from the group consisting of Zr, Hf, Ce and mixtures thereof, where the coating provides a chemical reaction barrier and a weakly-bonded interface surface between the reinforcement structures and the matrix.

Preferably, the composite is a ceramic matrix composite (CMC), where the reinforcement structures within the matrix material are fibers. These composites have a "high temperature capability" of up to at least 10,000 hours at 1100° C. They have "damage tolerance" in that the interface coating material can fracture or slip within the matrix in response to stress and can deter the propagation of matrix cracks. The interface coating is a "chemical barrier" which will prevent chemical reactions between the matrix and the fibers. The composite can also have an attached additional abradable insulating structure containing hollow, oxide-based spheres in a suitable heat resistant (up to 1300° C. or greater) binder, to form a hybrid-CMC. Hybrid-CMCs are especially useful as hot gas path turbine components (such as combustors, transitions, vanes, ring segments and turbine blades) for advanced gas turbines operating in a hot gas environment up to 1600° C. Preferably, both the reinforcement structures and the matrix are refractory oxide ceramics, such as alumina, mullite and yttria-alumina-garnet (YAG).

The CMCs of this invention, with the described scheelite germanate interface coatings, have the potential to satisfy the requirements of toughness, damage tolerance, thermal stability and long life (at least 10,000 hours), for use as hybrid-CMC hot gas path components in advanced gas turbine engines. Hot gas path components based on the hybrid-CMC concept and using the specialized CMCs of this invention will demonstrate a significant decrease (about 90%) in cooling air requirements, as compared to the current state-of-the-art metal components, resulting in an overall increase in efficiency of 1.5 to 2.0 percentage points. Scheelite germanate fiber coatings provide the following advantages over current oxide/oxide CMC technology: a reaction barrier between the fiber and the matrix; fiber/matrix sliding strain tolerance mechanisms to increase damage tolerance; less environmental exposure for the fibers to increase CMC life; and improved matrix dominated properties, for example, greater thermal conductivity and greater off-axis, compressive and interlaminar strength.

BRIEF DESCRIPTION OF THE DRAWING

The above and other advantages of the invention will be more apparent from the following description, in view of the drawing, in which:

FIG. 1 is a simplified cross-section showing the reinforced ceramic matrix composite of this invention.

DETAILED DESCRIPTION OF THE PREFERRED EMBODIMENTS

Referring now to the Figure, a ceramic matrix composite 20 is shown, having a matrix 10 (preferably of ceramic) with interspersed solid reinforcement structures 12, having approximate diameters of from 2.5 micrometers to about 100.0 micrometers or greater. For the sake of clarity, only a small number of reinforcement structures are shown in the given matrix area in the drawing. These reinforcement structures can be solid spheres, but most preferably are long whiskers or fibers (here, all shown in cross-section). Preferably, the matrix 10 and reinforcement structures 12 are over 70% of theoretical density, most preferably from 90% to 100% of theoretical density. At composite densities over 80%, it is more difficult to volatilize the coating 14 (described below). The reinforcement structures 12 (hereinafter referred to as fibers, for the sake of convenience), are coated with a material 14 consisting essentially of $ZrGeO_4$, $HfGeO_4$, $CeGeO_4$, and mixtures thereof. This coating must have a thickness Y ranging from 0.02 micrometers to 2.0 micrometers, preferably from about 0.04 micrometers to 1.0 micrometers. The coating is preferably 80% to 100% of theoretical density, to improve the durability of the coating during handling and during CMC processing. In some instances, as shown at 22, the coating may be discontinuous; and in some instances, as shown at 24, the reinforcement structures may contact one another. The combined amount of reinforcement structure and coating is from about 30 vol. % to about 50 vol. %. A crack 16 is shown propagating through the matrix 10, where it is deflected by the coating 14, which creates a weak bond between the fiber 12 and the matrix 10 at their interface 18, so that the fiber can slip within the matrix to accommodate the strain.

Many prior art structures have relied upon porous (less than 70% of theoretical density) matrices to supply damage tolerance. Such prior art structures compromised the mechanical (off-axis, compressive and interlaminar strengths) and thermal (conductive) properties of the CMC. Many CMCs relied on non-oxide fiber/matrix interface materials (such as pyrolitic carbon or hexagonal boron nitride), which possess good mechanical properties, but are subject to rapid oxidation in high temperature oxidizing environments.

The interface coating material used in sophisticated CMCs should protect the ceramic fiber during matrix processing and prevent reactions between the fiber and the matrix during long-term high temperature exposure, and should provide a week fiber/matrix interface, allowing processing of a matrix with a higher relative density, resulting in improved mechanical and thermal properties of the CMC. Furthermore, the deposition of the fiber coating should not degrade the properties of the ceramic fiber. Therefore, deposition should be performed at sufficiently low temperatures using precursors that are not corrosive to the fibers.

In this invention, a single layer scheelite germanate fiber coating is used in CMCs for advanced gas turbine applications. Scheelite germanate compounds include $ZrGeO_4$, $HfGeO_4$, and $CeGeO_4$. This invention encompasses scheelite slurry infiltration of the ceramic fiber tows and/or performs or chemical vapor deposition on the ceramic fibers, among other techniques. These fiber coating compounds are intended for use on alumina, mullite, and YAG fibers; however, these compounds could be used as fiber coatings for fibers of any composition. These scheelite germanate oxide ceramic coatings have the following characteristics: they are oxidation resistant; they provide a layered crystal structure and anisotropic thermal expansion; and they are relatively easily formed from simple oxides due to their low melting temperature. They are also minimally reactive with alumina, mullite and YAG fibers. It is believed that a hybrid-CMC formed from the CMC of this invention, in combination with an additional abradable insulating structure (such as previously described), would result in over 90% cooling air savings and about 2% improvement in heat rate, as well as reduced emissions, compared to a corresponding metal component.

The scheelite germanates used in this invention have a scheelite crystal structure and are relatively weak compounds. The scheelite crystal structure is layered. In general, the greater the degree of layering in the crystal structure, the weaker the interface material. The degree of thermal expansion anisotropy gives an indication of the degree of layering in the crystal structure. Table 1 shows the coefficient of thermal expansion (CTE) anisotropy of $CaWO_4$ and the scheelite germanates. The greater the percent (CTE) anisotropy, the weaker the interface material which provides a more damage tolerant composite.

TABLE 1

Thermal Expansion Anisotropy of Scheelite Compounds[1]

| Compound | CTE: c-axis | CTE: a-axis | Percent Anisotropy |
|---|---|---|---|
| $CaWO_4$ | 11.5 | 19.2 | 57 |
| $ZrGeO_4$ | 4.9 | 8.6 | 73 |
| $HfGeO_4$ | 4.2 | 7.1 | 63 |
| $CeGeO_4$ | 4.6 | 9.6 | 117 |

[1]From G. Bayer et al., "Thermal Expansion of $ABO_4$ Compounds with Zircon and Scheelite Structures", Journal of Less Common Metals, vol. 26, 1972, pp. 255–262.

Scheelite germanates have CTEC ranging from about 3.5 to about 10. The percent anisotropy was calculated as follows: percent anisotropy=([c:axis-a:axis]/a:axis)(100). $CaWO_4$ has been demonstrated as an effective fiber/matrix interface material in oxide/oxide CMCs. (See, for example, the article by R. W. Goettler et al., described previously.) In terms of crystal structure, the scheelite germanates are preferred over $CaWO_4$, because of their greater CTE anisotropy and their lower overall CTE, as noted in Table 1 (above).

Another characteristic, important to the coatings of this invention, is the ease of forming the scheelite gernanate compounds. Based on high temperature phase stability with alumina, a $ZrO_2$ fiber coating is an excellent choice for alumina-based CMCs. When $ZrO_2$ fiber coatings are produced from sols, the crystallization temperature is low (about 450° C.) and the sintering temperature of the crystallized phase is greater than the temperature capability of currently available polycrystalline oxide fibers. Thus, it is difficult to form dense, adherent $ZrO_2$ fiber coatings from a zirconia sol. The co-deposition of zirconia and germania sols significantly increases the crystallization temperature (to greater than 800° C. with a 50:50 mole ratio of $ZrO_2$ to $GeO_2$) and decreases the sintering temperature. Since the melting temperature of $GeO_2$ is relatively low (only 1086° C.), a viscous phase can be reached to enhance greatly the densification of the fiber coating. Related to the low melting temperature, the evaporation temperature of $GeO_2$ is also low (1550° C.), and the vapor pressure of $GeO_2$ is relatively high at temperatures above 1000° C. Consequently, heating could result in the evaporation of $GeO_2$ from a $GeO_2$-rich phase, thus causing the coating to transform to a refractory $ZrO_2$-rich phase.

The low melting temperature and high vapor pressure at temperatures of greater than 1000° C. can be a potential problem of using germanate compounds as fiber/matrix interface coatings for high temperature oxide/oxide CMCs. However, we have found that there are a number of mitigating factors which reduce the apparent disadvantages of germanate compounds. One mitigating factor is that the effectiveness of germanate compounds is not strongly dependent on stoichiometry. Zirconium germanate forms two compounds with a scheelite crystal structure, $ZrGeO_4$ and $Zr_3GeO_8$. Loss of $GeO_2$ from $ZrGeO_4$ (such as described above) causes the transformation to the more refractory $Zr_3GeO_8$ phase. Further loss of $GeO_2$ from $Zr_3GeO_8$ results in a highly refractory, porous $ZrO_2$ phase, which still provides an advantageous coating. Thus, the potential loss of $GeO_2$ does not seriously challenge the effectiveness of the coatings.

Another mitigating factor of using germanate compounds is that the temperature gradient in a minimally cooled, thermally insulated structural CMC (that is, a hybrid-CMC) reduces the potential loss of $GeO_2$. Only in a top portion 26 near the hot surface 28 will the CMC be hot enough to volatilize $GeO_2$ and ultimately form a refractory $ZrO_2$ interface. In a second portion 30 near the cooler surface 32 of the CMC, the $ZrGeO_4$ phase should remain at the interface. A third mitigating factor which may reduce the effect of $GeO_2$ volatility is the density of the matrix. If the $ZrGeO_4$ interface is imbedded in a matrix which is highly dense (greater than 80% of theoretical density), volatilization of $GeO_2$ should be slow.

A further advantage of the scheelite germanates is that $ZrGeO_4$, $HfGeO_4$, and $CeGeO_4$ compounds are minimally reactive with alumina, mullite and YAG fibers. This is important because strength retention of the fibers during long-term thermal exposure is critical. The scheelite germanates are more benign to those fibers than many of the coating compounds described in the prior art. For example, the cations of the scheelite germanates ($ZrO_2$, $HfO_2$ and $CeO_2$) are more phase compatible with alumina than the cation of $CaWO_4$ (CaO). Also, it is believed that the anion, $GeO_2$, does not react with mullite at or below 1100° C., which is near the maximum temperature capability of current fibers (which is approximately 1200° C.). Conversely, excess phosphate ($P_2O_5$) in monazite ($LaPO_4$) or xenotime ($YPO_4$) would likely react with alumina or mullite.

The present invention may be embodied in other forms without departing from the spirit or essential attributes thereof, and accordingly reference should be made to both the appended claims and the foregoing specification as indicating the scope of the invention.

What is claimed is:

1. A composite having high temperature and damage tolerance capability, comprising a matrix material having interspersed therein solid reinforcement structures coated with an interface coating material consisting essentially of scheelite germanates of the formula $MGeO_4$, where M consists of elements selected from the group consisting of Hf, Ce and mixtures thereof, where the coating provides a chemical reaction barrier and a weakly-bonded interface surface between the reinforcement structures and the matrix.

2. The composite of claim 1, where the matrix is ceramic.

3. The composite of claim 1, where the reinforcement structures are ceramic fibers.

4. The composite of claim 1, used as a turbine component.

5. The composite of claim 1, used as a turbine component selected from the group consisting of combustors, transitions, vanes, ring segments, turbine blades, and the like.

6. The composite of claim 1, having the ability to withstand temperatures of at least about 1100° C. for at least 10,000 hours.

7. The composite of claim 1, where the interface coating material can slip within the matrix in response to stress and can deter the propagation of matrix cracks.

8. The composite of claim 1, where the reinforcement structures are fibers made of a material selected from the group consisting of alumina, mullite and yttria-alumina-garnet.

9. The composite of claim 1, where the matrix is made of a material selected from the group consisting of alumina, mullite and yttria-alumina-garnet.

10. The composite of claim 1, having an additional attached abradable insulating structure containing hollow, oxide-based spheres within a heat resistant binder.

11. The composite of claim 1, where the matrix has a density of over 70% of theoretical density.

12. The composite of claim 1, where the combined amount of reinforcement structure and coating is from about 30 vol. % to about 50 vol. %.

13. The composite of claim 1, where the coating material has a coefficient of thermal expansion from about 3.5 to about 10.

14. A composite material having high temperature and damage tolerance capability, the composite material comprising:
 a matrix material comprising a first portion proximate a surface and a second portion below the first portion opposed the surface;
 a reinforcement structure disposed within the matrix material and extending into both the first portion and the second portion;
 a first interface coating material comprising one of the group of $ZrO_2$ and a first phase of scheelite germanate disposed between the reinforcement structure and the first portion of the matrix material; and
 a second interface coating material comprising a second phase of scheelite germanate different than the first phase disposed between the reinforcement structure and the second portion of the matrix material.

15. The composite material of claim 14, wherein the second interface coating comprises a $GeO_2$-rich phase of a scheelite germanate and the first interface coating comprises a refractory phase of the scheelite germanate formed by evaporating $GeO_2$ from the scheelite germanate.

16. The composite material of claim 14, wherein the first interface coating comprises a refractory material phase.

17. The composite material of claim 14, wherein the first interface coating comprises $ZrO_2$ and the second interface coating comprises $ZrGeO_4$.

18. A composite material having high temperature and damage tolerance capability, the composite material comprising:
 a matrix material;
 a reinforcement structure disposed within the matrix material;
 an interface coating material disposed between the reinforcement structure and the matrix material, the interface coating comprising a layered crystal structure having a thermal expansion anisotropy of greater than 73%, wherein the interface coating material comprises $CeGeO_4$.

19. A ceramic matrix composite material comprising:

a ceramic matrix material;

an oxide ceramic reinforcement structure dispersed within the matrix material; and an interface coating between the ceramic matrix material and the oxide ceramic reinforcement structure, the interface coating comprising a refractory phase of zirconium germanate comprising one of the group of $Zr_3GeO_8$ and a porous $ZrO_2$-rich phase.

20. The material of claim 19, wherein the interface coating comprises $Zr_3GeO_8$.

21. The material of claim 19, wherein the interface coating comprises a porous $ZrO_2$-rich phase of zirconium germanate.

* * * * *